United States Patent [19]
Main et al.

[11] Patent Number: 5,208,435
[45] Date of Patent: May 4, 1993

[54] LIGHTWEIGHT RAM FOR BODYMAKER

[75] Inventors: Ralph Main, San Pedro; Rodney Blue, Huntington Beach, both of Calif.

[73] Assignee: Sequa Corporation, New York, N.Y.

[21] Appl. No.: 797,387

[22] Filed: Nov. 25, 1991

[51] Int. Cl.$^5$ .............................................. B23K 15/00
[52] U.S. Cl. .............................. 219/121.13; 219/59.1; 219/121.63
[58] Field of Search ....................... 215/121.13, 121.14, 215/59.1, 121.63, 121.64

[56]                References Cited
U.S. PATENT DOCUMENTS

| | | | |
|---|---|---|---|
| 3,704,619 | 12/1972 | Paramonoff | 72/349 |
| 3,735,629 | 5/1973 | Paramonoff | 72/349 |
| 3,780,412 | 12/1973 | Millard | 29/159.2 |
| 3,826,122 | 3/1972 | Braeuninger | 72/264 |
| 4,036,047 | 7/1974 | Miller | 72/347 |
| 4,148,208 | 4/1979 | Maeder | 72/342 |
| 4,409,462 | 10/1983 | Jahnke | 219/121 ED |
| 4,530,228 | 7/1985 | Snyder et al. | 72/349 |
| 4,614,104 | 9/1986 | Straw | 72/347 |
| 4,639,571 | 1/1987 | Lewandowski et al. | 219/121 EC |

*Primary Examiner*—C. L. Albritton
*Attorney, Agent, or Firm*—Mitchell D. Bittman; Jerome M. Berlinger

[57]                ABSTRACT

A ram that is utilized in high speed apparatus for forming elongated one piece metal can bodies from shallow cups is constructed as a weldment in which there is an elongated relatively thin-walled tube, a tail piece metallurgically bonded to one end of the tube and a nose piece metallurgically bonded to the other end of the tube.

11 Claims, 1 Drawing Sheet

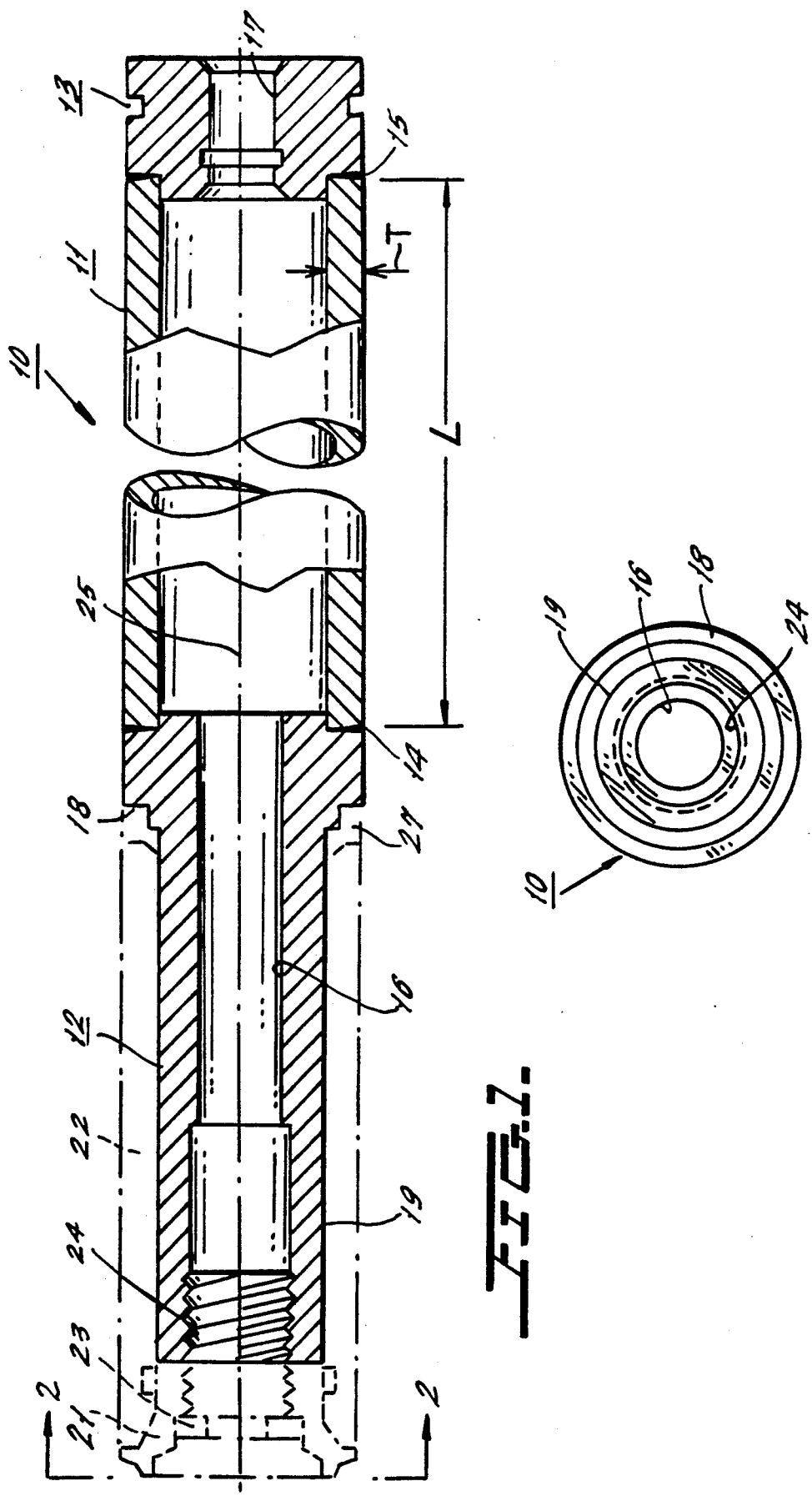

LIGHTWEIGHT RAM FOR BODYMAKER

BACKGROUND OF THE INVENTION

The invention relates to the construction of a ram that is utilized in high speed apparatus for forming elongated one piece metal can bodies from relatively shallow cups.

The main section or body of a so-called two piece metal container or can of the type very often used for beer/beverages includes an elongated cylindrical sidewall, an integral bottom and an open top. Such bodies are often formed in drawing and ironing machines of the type described in U.S. Pat. No. 3,704,619 issued Dec. 5, 1972 to E. Paramonoff for Redraw Blankholder Positioning Mechanism for Cup-shaped Article Formers such as Metallic Can Body Formers and the Like, U.S. Pat. No. 3,735,629 issued May 29, 1973 to E. Paramonoff entitled Apparatus for Forming One Piece Metallic Can Bodies, and U.S. Pat. No. 4,530,228 issued Jul. 23, 1985 to W. Snyder and D. Dettmer for Apparatus for Producing Seamless Container Bodies. The apparatus described in the aforesaid patents produce can bodies from blanks in the form of relatively shallow cups, by having a reciprocated ram drive each cup through a die pack which is a series of ringlike die elements having openings that are graduated. Each blank passes through the largest opening first, and each subsequent opening that the blank is driven through is slightly smaller than the preceding opening through which the blank has been driven.

A replaceable punch mounted to the ram at the front thereof engages each cup to drive it through the die pack. The rear end of the ram is connected to the drive means that reciprocates the ram along its horizontally positioned longitudinal axis through a forward working stroke followed by a rearward return stroke.

Conventionally, rams are manufactured from a single piece of barstock. This imposes severe limitations on readily machining the interior of the hollow elongated main center section of the ram. This problem arises because the axial passages at both ends of the ram are limited in diameter, being considerably less than the center section diameter that will still enable the center section to provide the required mechanical strength (without having excessive wall thickness). Thus, in the prior art wall thickness of the main center section was unusually considerably greater than necessary to meet strength requirements, so that the rams were unnecessarily heavy.

SUMMARY OF THE INVENTION

To produce a relatively lightweight ram the instant invention provides a unitary structure that is constructed by metallurgically bonding a nose piece and a tail piece to opposite ends of an elongated thin walled tube that constitutes the center section. Bonding is done by utilizing electron beam welding which achieves attachment strength that is for all practical purposes equal to the strength found in a ram manufactured from a single piece of barstock. Preferably, tube wall thickness is selected so that it does not exceed substantially that thickness required to provide sufficient strength for the job that the ram is required to perform, thereby minimizing weight. The reduction in weight achieved by welding three pieces together to form the ram is significant and results in increased can production because an increase in the cyclic rate of the machine is permitted.

Accordingly, the primary object of the instant invention is to provide a relatively lightweight ram for a can body maker.

Another object is to provide a ram of this type that is constructed of three elements metallurgically bonded together to form a unitary structure.

Still another object is to provide a ram of this type that is manufactured by utilizing electron beam welding techniques.

A further object is to provide a ram of this type in which the main elongated center section thereof has a length to wall thickness ratio greater than one hundred.

A still further object is to provide a ram of this type which permits increased machine speed.

These objects as well as other objects of this invention shall become readily apparent after reading the following description of the accompanying drawings in which:

BRIEF DESCRIPTION OF THE DRAWINGS

FIG. 1 is a partially sectioned side elevation of a lightweight ram constructed in accordance with teachings of the instant invention.

FIG. 2 is an end view of the ram looking in the direction of arrows 2—2 of FIG. 1.

Now referring to the Figures.

DETAILED DESCRIPTION OF THE DRAWINGS

Ram 10 is a weldment constructed by utilizing weld 14 to metallurgically bond nose piece 12 to the front end of thin walled tubular center section 11, and weld 15 to metallurgically bond tail piece 13 to the rear of main section 11. Welds 14, 15 are the products of so-called electron beam welding. Typically, main section 11 has a length L that is approximately 42 inches and is at least one hundred times greater than the wall thickness T of main section 11. In a practical construction, main section 11 has an outer diameter of approximately 2.5 inches and an inner diameter of approximately 2 inches. This results in a wall thickness of ¼ inch which is a reduction of as much as 64% of the ⅝ inch to 11/16 inch wall thickness of the central section in prior art rams that are machined from a single piece of bar stock. When the wall thickness of main section 11 is ⅛ inch, this is an 82% reduction from the 11/16 inch wall thickness found in the prior art.

Suitable axial lengths for nose piece 12 and tail piece 13 are approximately 6.6 inches and 1.7 inches, respectively. The diameters of the axial passages 16, 17 for the respective nose and tail pieces are approximately ¾ of an inch, although passage 16 is illustrated as being slightly greater in cross-section than is passage 17.

Nose piece 12 is adapted to mount and operatively position punch nose 21 and sleeve 22, with the latter surrounding and being closely fitted to cylindrical outer surface portion 19 of nose piece 12. Punch elements 21, 22 are secured in place by retainer screw 23 having external threads that mate with internal threads 24 at the front of passage 16. At the end of punch sleeve 22 remote from nose 21 spacer ring 27 is interposed between sleeve 22 and nose piece shoulder 18.

Tail piece 13 is adapted to be connected to a drive means (not shown) for reciprocating ram 10 along its longitudinal axis 25. Suitable drive means for ram 10 as well as other details of can body forming apparatus are described in the aforesaid U.S. Pat. Nos. 3,704,619, 3,735,629 and/or 4,530,228. The teachings of these three patents are incorporated herein by reference.

Electron beam welding that forms welds 14 and 15 and thereby achieves metallurgical bonding between elements 11, 12 and 13 achieves attachment strength that is, for practical purposes, equal to having a unit of single piece construction.

Because the wall of tubular main section 11 is essentially no thicker than required, ram 10 is relatively lightweight so that inertia forces are reduced. Comparing ram 10 with prior art rams, reductions in weight of up to about 45% are obtainable. Because of this foundation vibration is lessened and machine wear slows down considerably, thereby permitting machine speed to be increased without harmful effects. Ram 10 is also interchangeable with rams of conventional one piece construction.

Elements 11, 12 and 13 are constructed of alloy steel, with 9310 VAR being suitable for this purpose. After elements 11, 12 and 13 are axially aligned and then bonded together by welds 14, 15, the assembly is subjected to stress relieving, carburizing and finish machining operations including forming of threads 24. As an alternative, elements 11, 12 and 13 before they are assembled, and after applying welds 14, 15 stress relieving is done only at localized areas adjacent these welds 14, 15.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A weldment constituting a lightweight ram for high speed apparatus that produces relatively elongated can bodies by driving relatively shallow cups through a ring type die means, said weldment including:
   a nose piece constructed to mount and operatively position a punch on said ram;
   a tail piece adapted for connection to a drive means that reciprocates the ram along its longitudinal axis;
   an elongated relatively thin-walled tube having a front end and a rear end;
   said tube, said nose piece and said tail piece being in axial alignment, with said tube interposed between said nose piece and said tail piece;
   a first weld fixedly securing said nose piece to said tube at said front end and extending forward thereof; and
   a second weld fixedly securing said tail piece to said tube at said rear end and extending rearward thereof.

2. A weldment as defined by claim 1 in which the first and second welds metallurgically bond the tube to the nose piece and the tail piece, respectively.

3. A weldment as defined by claim 2 in which the first and second welds are produced by electron beam welding.

4. A weldment as defined by claim 1 in which the tube, the nose piece and the tail piece are constructed of alloy steel.

5. A weldment as defined by claim 1 in which the tube has a length that is greater than one hundred times its wall thickness.

6. A weldment as defined by claim 5 wherein there are aligned axial passages through the tube, the nose piece and the tail piece, with the axial passage of the tube having a diameter of at least two times the diameter of the axial passages for both the nose piece and the tail piece.

7. A weldment as defined by claim 5 wherein the tube has an axial passage that is of a diameter which is greater than 75% of the outer diameter of the tube.

8. A method for constructing a lightweight steel ram for high speed apparatus that produces relatively elongated can bodies by driving relatively shallow cups through a ring type die means, said method including the steps of:
   constructing a nose piece adapted to mount and operatively position a punch on the ram and constructing a tail piece adapted for connection to a drive means for reciprocating the ram along its longitudinal axis;
   metallurgically binding the nose piece to the front end of an elongated thin walled tube and metallurgically bonding the tail piece to the rear end of the tube to form a ram in which the tube, the nose piece and the tail piece are axially aligned.

9. A method for constructing a ram as set forth in claim 8 in which the metallurgical bonding is the result of electron beam welding.

10. A method for constructing a ram as set forth in claim 9 in which, following the metallurgical bonding steps, the ram is subjected to stress relieving and carburizing.

11. A method for constructing a ram as set forth in claim 8 also including the steps of:
   heat treating the tube, the nose piece and the tail piece prior to bonding them together; and
   stress relieving the assembled tube, nose piece and tail piece only at localized areas adjacent the interface between the tube and the nose piece and the interface between the tube and the tail piece.

* * * * *